United States Patent [19]

Pelensky et al.

[11] 4,186,405

[45] Jan. 29, 1980

[54] MARKER HOLDER CLIP

[75] Inventors: Joseph Pelensky, Philadelphia, Pa.; Erdman Charles A., Marlton, N.J.

[73] Assignee: Graphic Controls Corporation, Buffalo, N.Y.

[21] Appl. No.: 902,937

[22] Filed: May 5, 1978

[51] Int. Cl.² ............................................. G01D 15/16
[52] U.S. Cl. ................................................. 346/140 A
[58] Field of Search .................................... 346/140 A

[56] References Cited
U.S. PATENT DOCUMENTS

| | | | |
|---|---|---|---|
| 1,630,297 | 5/1927 | Heesch | 346/140 A |
| 3,137,539 | 6/1964 | Graham | 346/137 |
| 3,983,569 | 9/1976 | Hubbard et al. | 346/140 A |
| 4,024,547 | 5/1977 | Raahauge | 346/140 A |
| 4,048,640 | 9/1977 | Caldwell | 346/140 A |
| 4,052,713 | 10/1977 | Lytle et al. | 346/140 A |
| 4,129,876 | 12/1978 | Hubbard | 346/140 A |

*Primary Examiner*—George H. Miller, Jr.
*Attorney, Agent, or Firm*—Miller & Prestia

[57] ABSTRACT

An instrument marker holder clip is provided for positioning and retaining an instrument marker of the type having a hinged member adapted to engage and lock against a portion of the marker body. The clip comprises an elongated band with a decreased width portion formed therein between the forward and rearward band ends. The hinged member of the marker is locked around this decreased width portion and reliably positioned against the edge features thereof.

7 Claims, 5 Drawing Figures

U.S. Patent    Jan. 29, 1980    Sheet 1 of 2    4,186,405
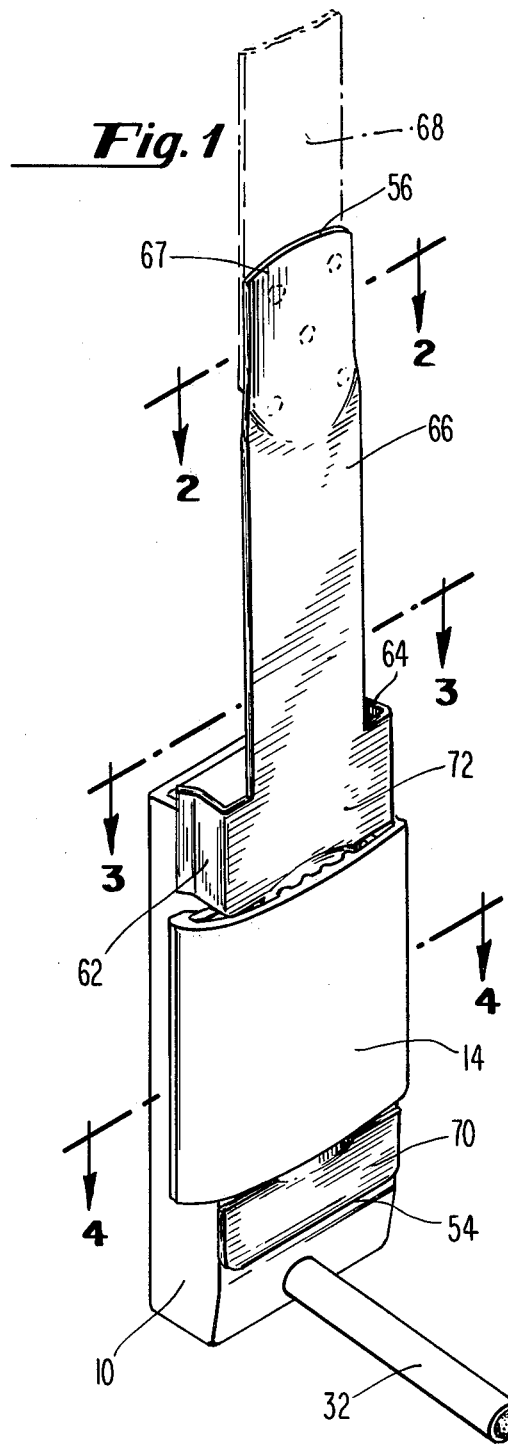
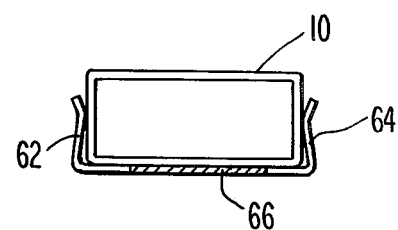
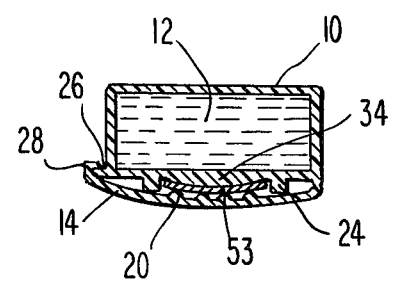

MARKER HOLDER CLIP

BACKGROUND OF THE INVENTION

1. Field of the Invention

This application relates to a marker holder clip which is adapted to accurately position and retain a recorder instrument marker having a hinged holding member that is designed to lock against a portion of the marker body. Such markers are sometimes referred to in the art as "clip-on" markers.

2. Discussion of the Prior Art

Various means have been employed to secure instrument pens or markers onto the holders or arms of recording instruments. For instance, in U.S. Pat. No. 4,048,640 (Caldwell), a pen cartridge and pen mounting arm are disclosed wherein one end of the mounting arm comprises a notch formed therein and a pair of stop shoulders are provided on opposed sides of the arm to cooperate with a mating assembly on the ink pen cartridge when the arm and cartridge are engaged.

In U.S. Pat. No. 4,024,547 (Raahauge) an instrument recorder pen is disclosed that includes an ink cartridge having spaced apart lugs on the underside thereof to receive a marker support arm. As can be seen in FIG. 4 of this patent, the marker support arm itself has a generally convex surface portion which presses against the cartridge as the arm is engaged in the lugs.

Of further interest is U.S. Pat. No. 3,137,539 (Graham) wherein a pair of tab members are provided on the end of a stylus arm to position the marker. Of similar interest is U.S. Pat. No. 4,052,713 (Lytle et al) which discloses a universal snap mounting for disposable chart pens wherein one end of the recorder arm is provided with a "V" shaped notched end into which the writing nib is received. A spring clip 38 with tab portions 40, 44 "snap clips" the ink cartridge to the arm. Also, in U.S. Pat. No. 3,876,050 an armature structure for coupling a recorder pen and a reset spring in mosaic printing applications is disclosed. Here, the armature comprises a magnetic metal strip having a tubular portion formed in one end thereof and flanged edge portions at the other end thereof.

Other means for securing pens to their support arms may be seen in U.S. application Ser. No. 654,406 (Hubbard) allowed Feb. 24, 1978 and U.S. Pat. No. 3,983,569 (Hubbard et al), which patents are commonly assigned herewith.

Notwithstanding these prior art means for securing writing instruments to their holders, there remains a need in the art for a holder clip that can accurately position and reliably maintain the marker or pen under conditions of considerable disturbance, such as marker change of nearby positions on multi-marker recorders.

There is also a need for a holder clip which will substantially prevent any movement of the marker along the marker support arm axis.

There is a particular need for a holder clip which is adapted for use in conjunction with a "clip-on" type marker, such as that disclosed in U.S. Pat. No. 3,983,569, which clip will substantially eliminate marker movement along the support arm under conditions of considerable disturbance as caused by vibration or the change in marker positions on multi-marker recorder instruments.

These and other objects are met by the marker holder clip of the present invention, which may be better understood by reference to the following detailed description thereof, taken in conjunction with the appended claims and drawings.

DRAWINGS

In the drawings:

FIG. 1 is a perspective view of a marker holder clip in accordance with the invention, in engagement with a "clip-on" type marker;

FIG. 2 is a sectional view of the marker holder clip as shown in FIG. 1, taken along the lines and arrows 2—2 of FIG. 1;

FIG. 3 is a sectional view of the marker holder clip and associated "clip-on" marker of FIG. 1, taken along the lines and arrows 3—3 of FIG. 1;

FIG. 4 is another sectional view of the marker holder clip and associated "clip-on" marker of FIG. 1, taken along the lines and arrows 4—4 of FIG. 1;

DETAILED DESCRIPTION

Figure 5:
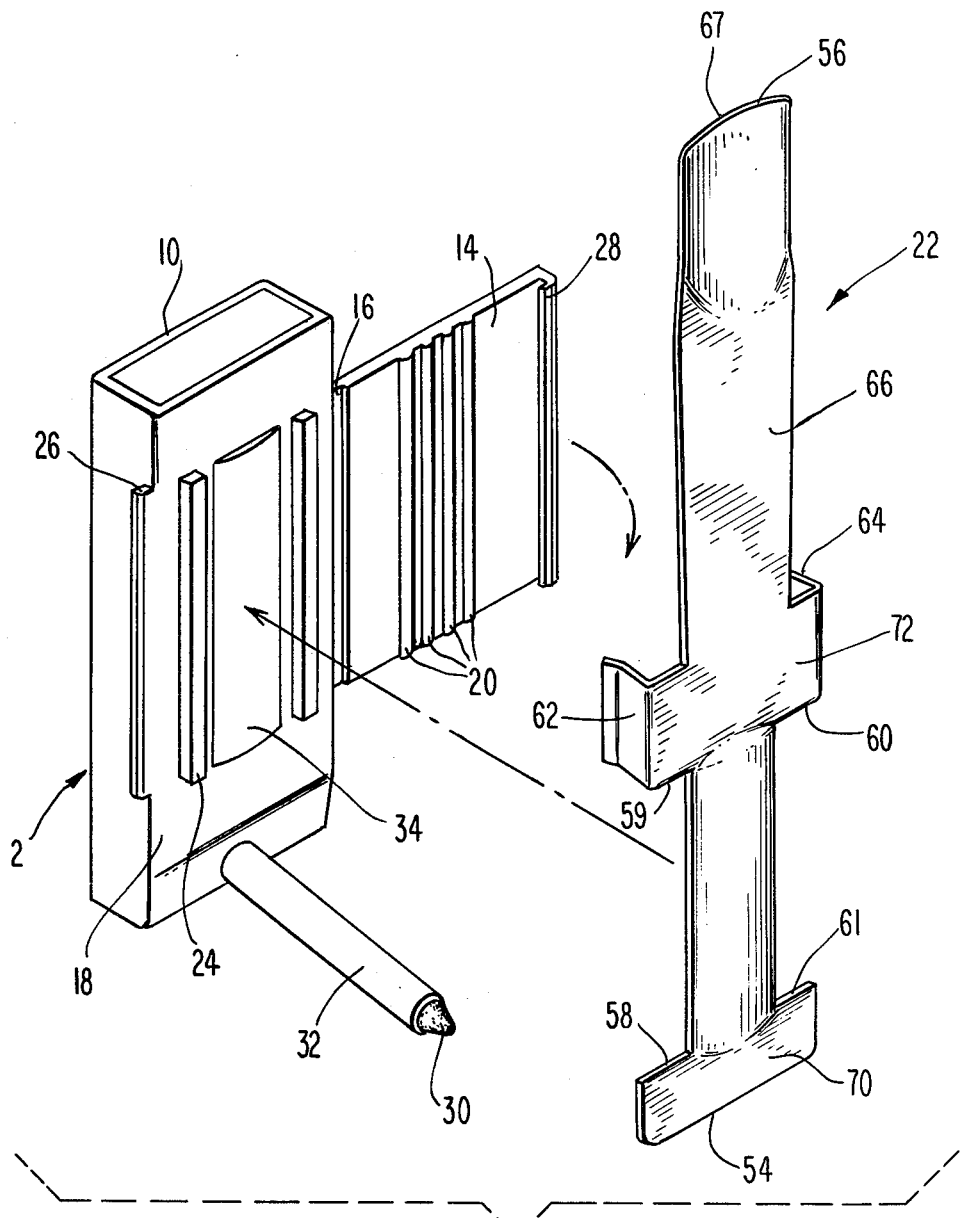
FIG. 5 is an exploded perspective view of a marker holder clip and "clip-on" marker in accordance with the invention.

In the specification which follows, specific terms will be used for the sake of clarity, and as descriptions of the specific forms of the invention which have been selected for illustration in the drawings. However, the use of such specific terms, and the use of such specific embodiments in the drawings, is not intended to imply any limitation with respect to the scope of the invention which is defined in the appended claims.

With reference to FIG. 5 of the drawings, there is shown clip-on marker 2 of the type disclosed in the aforementioned U.S. Pat. No. 3,983,569. Clip-on marker 2 comprises a plastic bucket marker pen body 10 defining an ink reservoir 12 and including a hinged pen arm holding member 14 folded, at fold line 16, against surface 18 of marker body 10. Molded ridges or projections 20 on hinged member 14 press against marker holder clip 22, with which pen body 10 is assembled, securely holding marker holder clip 22 against surface 18. Molded projections or ridges 24 on surface 18 of pen body 10 assist in securing marker holder clip 22 in a fixed position on surface 18 of pen body 10. Pen body 10 and hinged member 14 also include engageable locking members 26 and 28 respectively, adapted to prevent movement of hinged member 14 when it is folded upon surface 18 and in that position is wrapped about marker holder clip 22. Writing nib 30 protrudes from Nib holding tube 32 which projects from pen body 10. As best shown in FIGS. 4 and 5, clip-on marker 2 further comprises a convex surface 34 located along a portion of surface 18.

As best shown in FIG. 5, marker holder clip 22 comprises an elongated band, preferably made of metal. The band includes a first portion of decreased width 52, which is positioned between the forward end 54 and the rearward end 56 of the band. Portion 52 is provided with a concave face 53 (as can be best seen in FIG. 4) to mate with convex surface 34 of clip-on marker 2 as hinged member 14 is fitted about portion 52 and locked by engagement of engageable locking members 26, 28. Pen 2 is thus reliably secured against axial movement along marker holder clip 22 due to the abutment of hinged member 14 and edges 58, 59, 60, 61 of non-decreased width sections 70, 72.

Spaced rearwardly from first decreased width portion 52 in non-decreased width section 72, are resilient positioning tabs 62, 64, which extend upwardly from clip 22. Tabs 62, 64 are positioned along opposed width-wise edges of clip 22 so that a portion of clip-on marker 2 can be seated therebetween. Tabs 62, 64 also are helpful to relieve stress on the engageable locking members 26, 28.

As can be seen in FIG. 3, the angles $\alpha$, $\beta$ between each tab 62 or 64 and marker holder clip 22 are acute angles so that the tabs bear against marker body 10 to retain same in the desired position. The top portions of tabs 62, 64 extend away from the center of marker holder clip 22 so as to facilitate easy mounting of clip-on pen 2 to marker holder clip 22.

With reference to FIGS. 1 and 5, second decreased width portion 66 is spaced rearwardly from tabs 62, 64. In this, the preferred form of the present invention, the rear end of portion 66 is formed with a convex face 67 (see FIG. 2) adapted to conform to the curvature of a typical pen arm 68 when pen arm 68 and clip 22 are joined by a lap joint.

Having thus described our invention, we claim and desire to secure by Letters Patent:

1. An instrument marker holder clip for positioning and retaining an instrument marker of the type having a hinged member adapted to engage and lock against a surface of the marker body, said clip comprising an elongated band having a portion of predetermined width located between the forward and rearward ends of said band, said band also including, at the longitudinal limits of said portion, outwardly extending projections, said portion adapted so that the hinged member of said marker may be locked about said predetermined width portion and positioned against said projections on either side thereof along the length of said clip.

2. An instrument marker holder clip as recited in claim 1 further comprising a pair of resilient positioning tabs spaced rearwardly from said predetermined width portion and extending upwardly from said band, whereby a portion of the marker can be seated between said tabs.

3. An instrument marker holder clip as recited in claim 2 wherein each of said tabs forms an acute angle with said band.

4. An instrument marker holder clip as recited in claim 2 wherein said tabs are positioned along opposed width-wise edges of said band.

5. An instrument marker holder clip as recited in claims 1, 2 or 3 wherein said predetermined width portion is provided with a concave surface.

6. An instrument marker holder clip as recited in claims 1, 2, 3 or 4 further comprising a convex surface located at the rearward end of said band adapted to conform to the curvature of a pen arm attached to said rearward end.

7. An instrument marker holder clip, as recited in any of said claims 2, 3 or 4, wherein said outwardly extending projections at one end of said predetermined width portion include said positioning tabs.

* * * * *

UNITED STATES PATENT AND TRADEMARK OFFICE
CERTIFICATE OF CORRECTION

PATENT NO. : 4,186,405
DATED : 1/29/80
INVENTOR(S) : Joseph Pelensky, Charles A. Erdman, William Tallerico It is certified that error appears in the above-identified patent and that said Letters Patent are hereby corrected as shown below:

On the face of the patent please add to the inventors there listed:
William A. Tallerico,
Willingboro, N.J.

Signed and Sealed this

Twentieth Day of May 1980

[SEAL]

Attest:

SIDNEY A. DIAMOND

Attesting Officer

Commissioner of Patents and Trademarks